United States Patent
Hefner et al.

(10) Patent No.: US 10,717,526 B2
(45) Date of Patent: Jul. 21, 2020

(54) UAV WITH IN-FLIGHT ADJUSTABLE WINGS

(71) Applicant: Bell Helicopter Textron Inc., Fort Worth, TX (US)

(72) Inventors: Levi Charles Hefner, Arlington, TX (US); Danielle Lynn Moore, Fort Worth, TX (US); Andrea Chavez, Colleyville, TX (US); Kirk Landon Groninga, Keller, TX (US); John Lloyd, Arlington, TX (US); Daniel Bryan Robertson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 377 days.

(21) Appl. No.: 15/620,310

(22) Filed: Jun. 12, 2017

(65) Prior Publication Data

US 2018/0354619 A1   Dec. 13, 2018

(51) Int. Cl.
*B64C 39/02*   (2006.01)

(52) U.S. Cl.
CPC ...... *B64C 39/024* (2013.01); *B64C 2201/102* (2013.01); *B64C 2201/108* (2013.01)

(58) Field of Classification Search
CPC ............ B64C 39/024; B64C 2201/102; B64C 2201/108; B64C 3/56
See application file for complete search history.

(56) References Cited

U.S. PATENT DOCUMENTS

| | | |
|---|---|---|
| 10,054,958 B2 | 8/2018 | Creasman |
| 2002/0074452 A1 | 6/2002 | Ingram |
| 2006/0011777 A1 | 1/2006 | Arlton et al. |
| 2009/0072094 A1* | 3/2009 | Sanderson ............... B63G 8/26 244/218 |
| 2009/0166477 A1* | 7/2009 | Bousfield ................. B64C 3/18 244/218 |
| 2011/0001016 A1* | 1/2011 | Skillen ...................... B64C 3/40 244/218 |
| 2017/0283035 A1* | 10/2017 | Ji .............................. B64C 3/56 |
| 2018/0354612 A1* | 12/2018 | Hefner ................. B64C 27/605 |
| 2019/0248469 A1* | 8/2019 | Hefner ...................... B64C 5/02 |

FOREIGN PATENT DOCUMENTS

| | | |
|---|---|---|
| CN | 205150232 U | 4/2016 |
| GB | 2491129 A | 11/2012 |
| JP | 2002316699 A | 10/2002 |
| JP | 2005289128 A | 10/2005 |
| WO | 2014025444 A2 | 2/2014 |
| WO | 2016077278 A1 | 5/2016 |
| WO | 2017044388 A1 | 3/2017 |

OTHER PUBLICATIONS

European Exam Report in related European Patent Application No. 18171894.1, dated Aug. 20, 2018, 25 pages.
European Search Report in related European Patent Application No. 18171894.1, dated Jul. 23, 2018, 4 pages.

* cited by examiner

*Primary Examiner* — Rodney A Bonnette
(74) *Attorney, Agent, or Firm* — Lightfoot & Alford PLLC

(57) ABSTRACT

An Unmanned Aerial Vehicle (UAV) has a fuselage, a rotor system, and a wing configured for selective positioning during flight of the UAV to a deployed position, a stowed position, and to positions between the deployed position and the stowed position. The UAV has a flexible wing skin at least partially carried by a leading arm and the leading arm is rotatable relative to the fuselage.

15 Claims, 13 Drawing Sheets

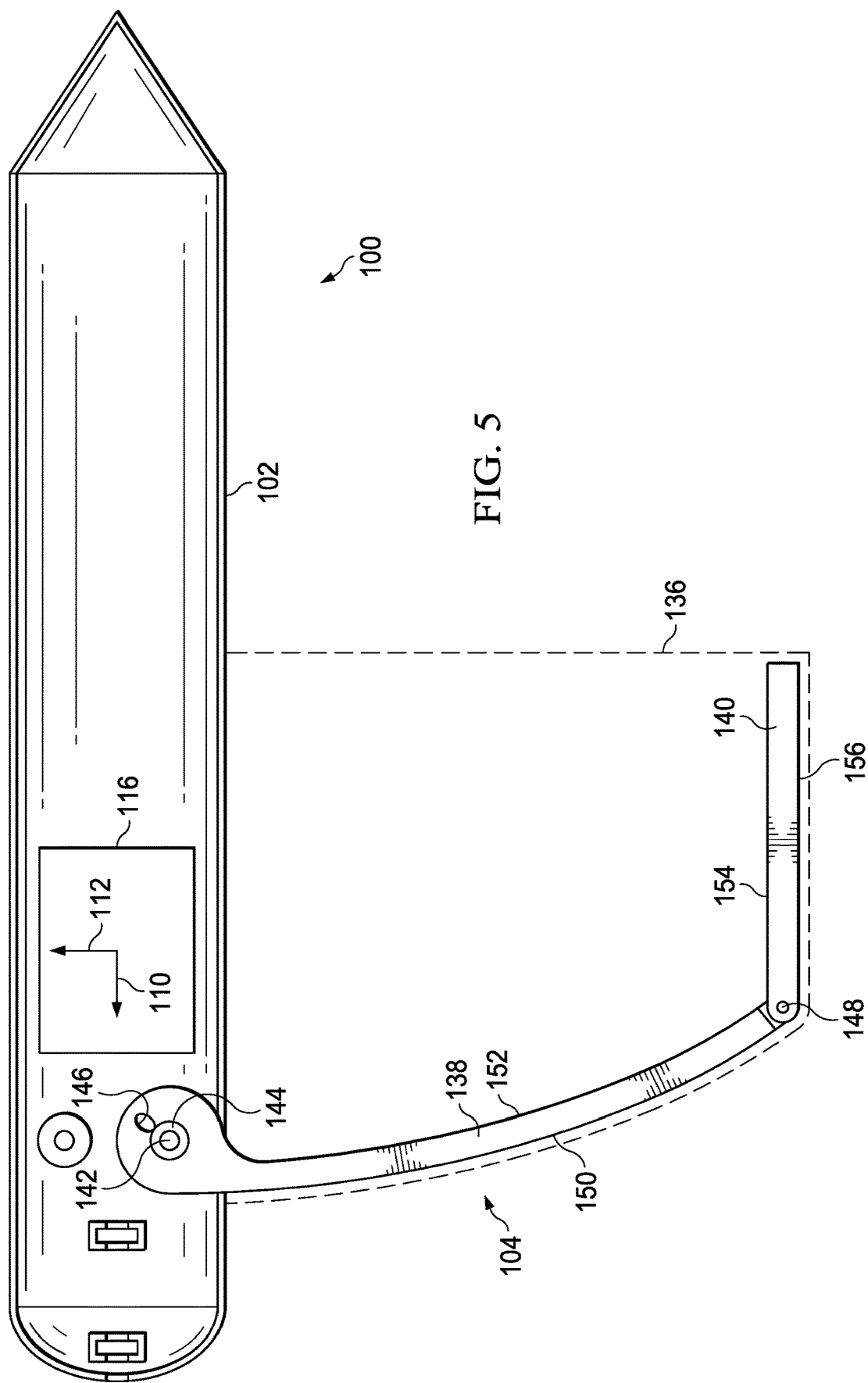

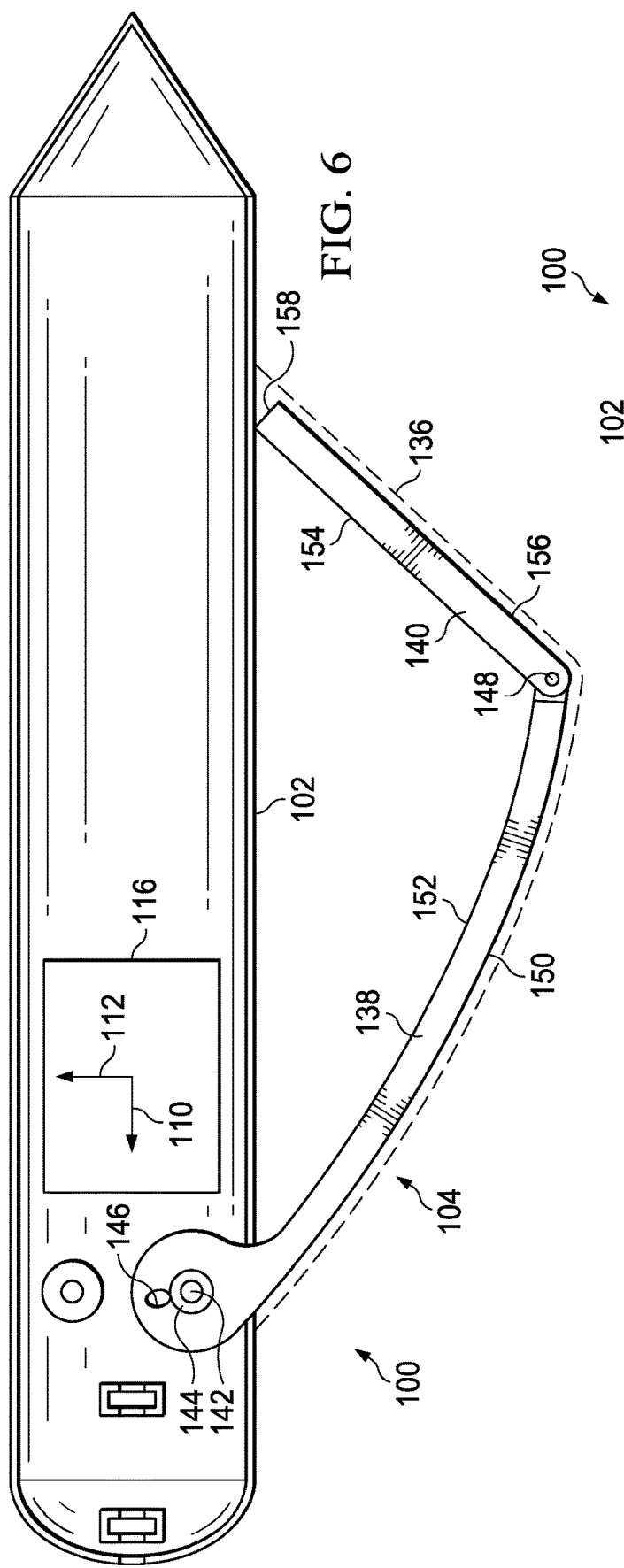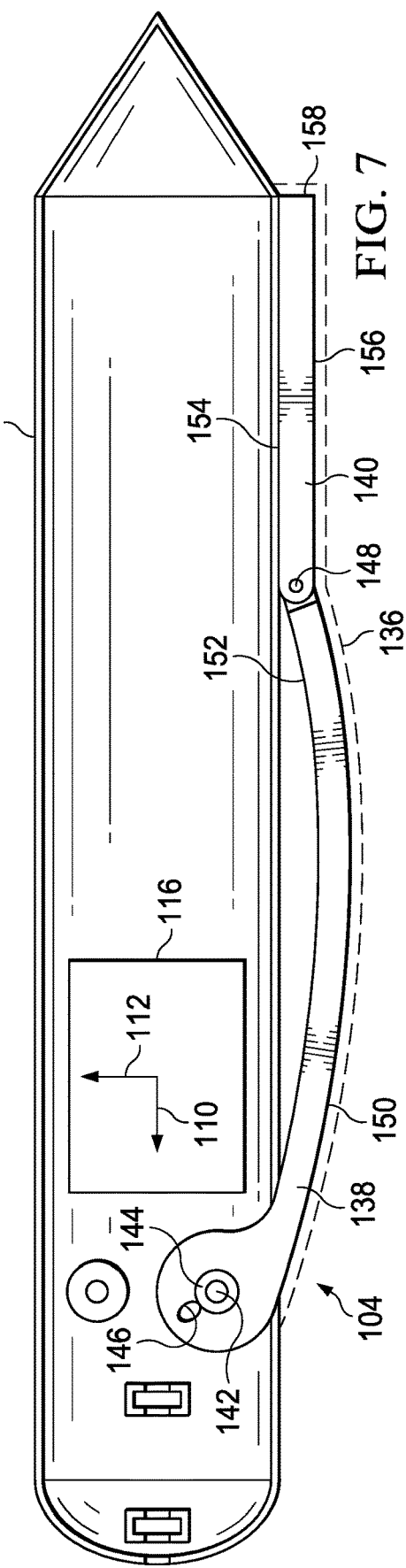

UAV WITH IN-FLIGHT ADJUSTABLE WINGS

BACKGROUND

Some aircraft, such as, but not limited to, Unmanned Aerial Vehicles (UAVs), comprise wings configured to expand or otherwise deploy upon launch or takeoff of the UAVs. Also, some aircraft, such as, but not limited to, UAVs, comprise coaxial counter-rotating rotors systems.

BRIEF DESCRIPTION OF THE DRAWINGS

FIGS. 5-7 are schematic views of an adjustable wing of the UAV of FIG. 1 in various states of deployment.

DETAILED DESCRIPTION

Illustrative embodiments of the embodiments are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
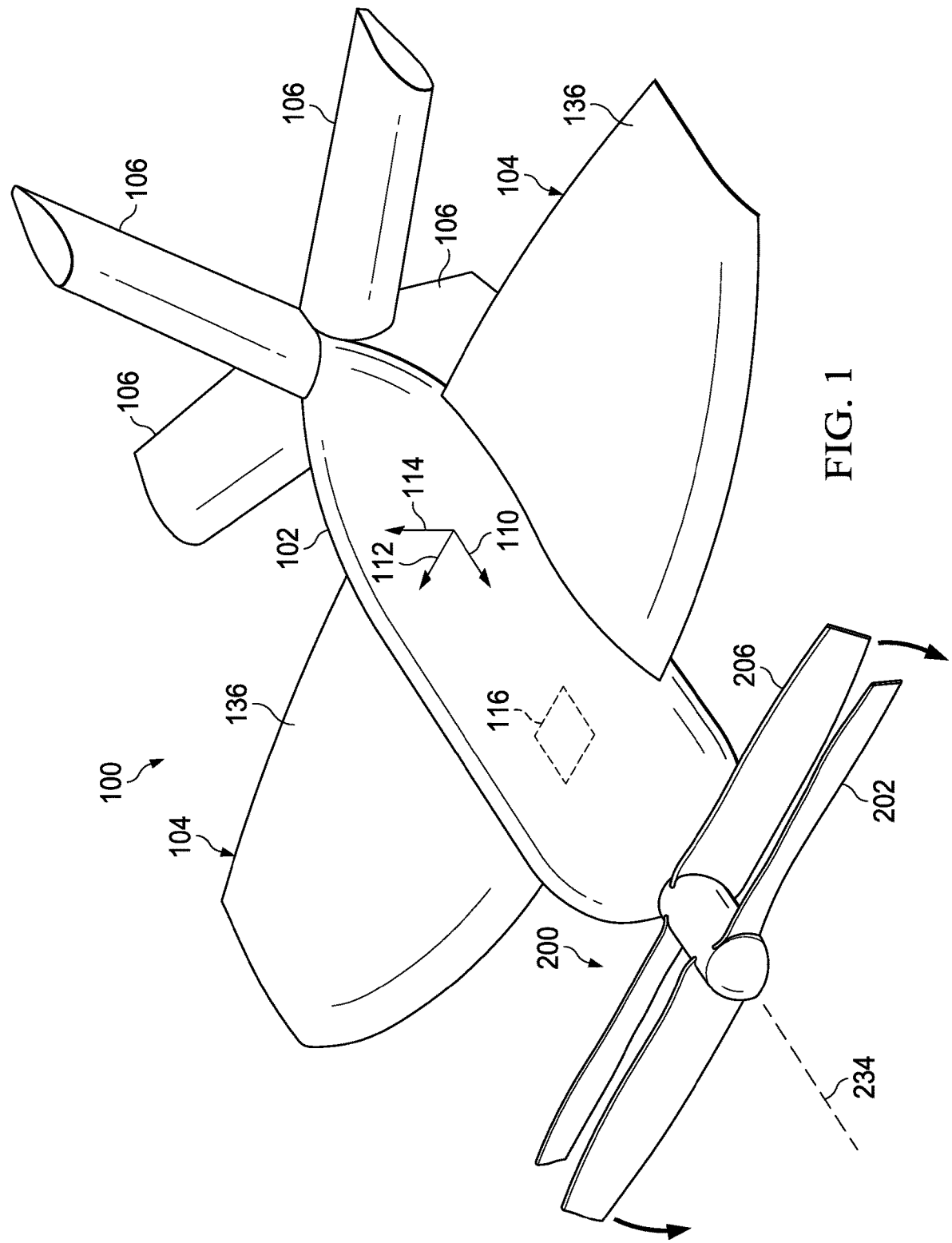
FIG. 1 an oblique view of an Unmanned Aerial Vehicle (UAV) according to an embodiment of this disclosure in an airplane mode of operation.
Figure 2:
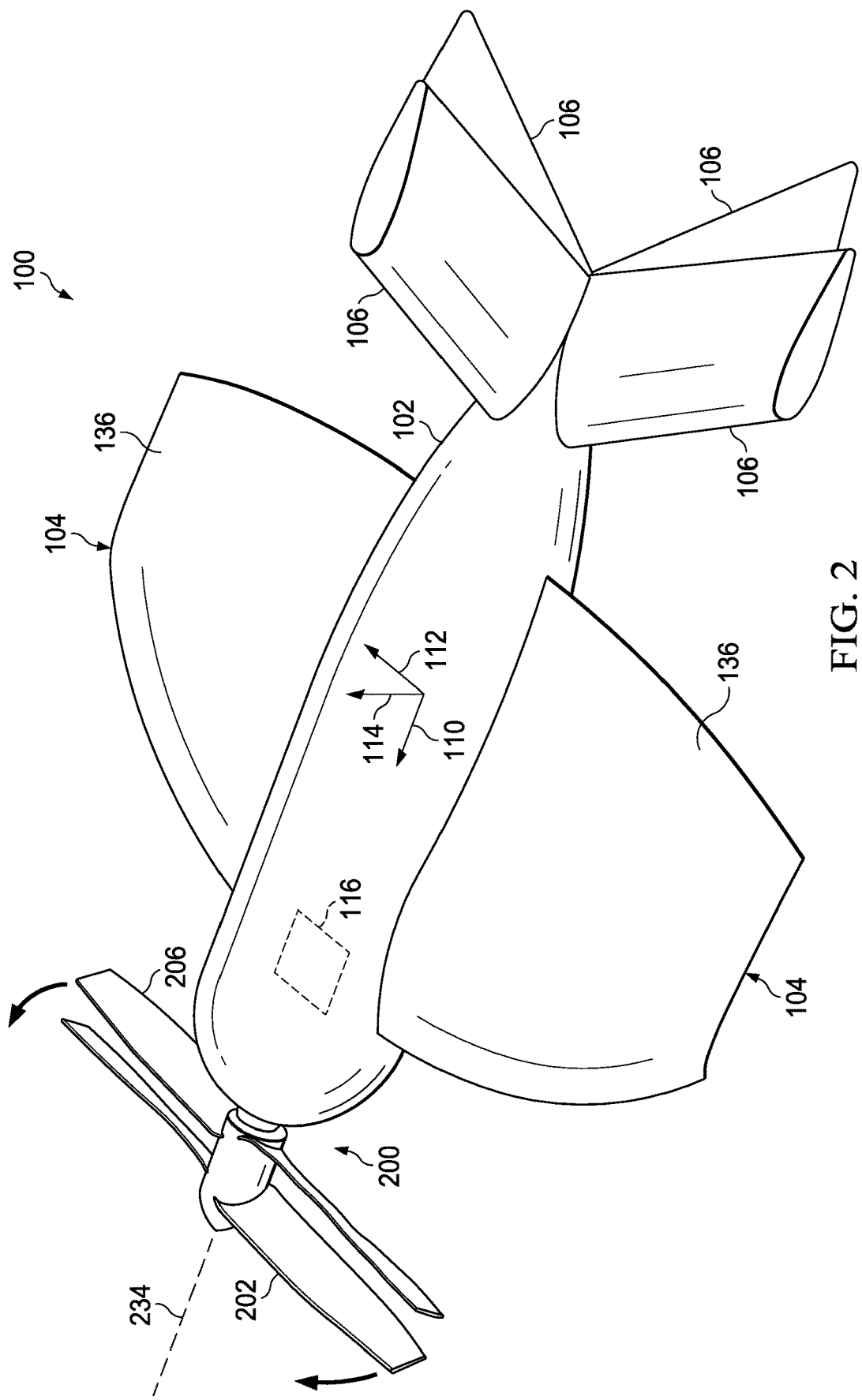
FIG. 2 is another oblique view of the UAV of FIG. 1 in the airplane mode of operation.

Referring to FIGS. 1 and 2 in the drawings, a UAV 100 according to the present disclosure is illustrated in an airplane mode of operation. The UAV 100 generally comprises a fuselage 102, adjustable wings 104, movable tail extensions 106, and a coaxial counter-rotating rotor system 200. Most generally, UAV 100 can be selectively operated in an airplane mode (see FIGS. 1 and 2), a helicopter mode (see FIG. 3), and transition modes therebetween during which the UAV 100 can selectively switch between the airplane mode and the helicopter mode during flight. In some embodiments, the UAV 100 can selectively remain in a transition flight mode for a period of time longer than necessary to switch between the airplane mode and the helicopter mode. UAV 100 can be referred to as comprising a three-dimensional coordinate system comprising a first axis 110, a second axis 112 orthogonal relative to the first axis 110, and a third axis 114 is normal to a plane shared by the first axis 110 and the second axis 112. The first axis 110 extends generally along a length of the UAV 100 and substantially parallel to a length of the fuselage 102. The second axis 112 extends generally parallel to a length or span of the adjustable wings 104. When the UAV 100 is operating in the airplane mode, the first axis 110 is generally associated with a forward-rearward directionality, the second axis 112 is generally associated with a left- and right directionality, and the third axis 114 is generally associated with an up-down directionality. However, because UAV 100 can operate in a variety of orientations, it is further helpful to understand that when the UAV 100 is operating in the helicopter mode, the first axis 110 is generally associated with an up-down directionality while the second axis 112 and the third axis 114 are generally associated with lateral directions.

The UAV 100 further comprises a Power and Control System (PCS) 116. The PCS 116 comprises the components necessary to power and selectively control operation of the UAV 100 as a whole. More specifically, the PCS 116 comprises components configured to selectively power and control at least the rotor system 200 and the adjustable wings 104 (each being discussed in greater detail below). PCS 116 comprises a battery 118 for providing electrical energy to power one or more components of the UAV 100. PCS 116 comprises at least one wing actuator 120 configured to selectively adjust one or more of the adjustable wings 104. The PCS 116 further comprises an inner drive motor 122 and an outer drive motor 124. The inner drive motor 122 can be powered by the battery 118 to selectively provide rotational power to one of the two independently driven blade assemblies of the rotor system 200. The outer drive motor 124 can be powered by the battery 118 to selectively provide rotational power to the other one of the two independently driven blade assemblies of the rotor system 200. In this embodiment, the inner drive motor 122 is associated with an inner shaft (discussed in detail below) and the outer drive motor 124 is associated with an outer shaft (discussed in detail below) through which the inner shaft 204 is received. In this embodiment, the movable tail extensions 106 that extend generally horizontally when the UAV 100 is in the airplane mode of operation are capable of moving in a manner substantially similar to ailerons and/or comprise ailerons. Similarly, the movable tail extensions 106 that extend generally vertically when the UAV 100 is in the airplane mode of operation are capable of moving in a manner substantially similar to rudders and/or comprise rudders. Accordingly, the PCS 116 comprises tail extension actuators 135 configured to selectively actuate the movable tail extensions 106. Still further, the PCS 116 comprises swashplate actuators 137 configured to selectively provide the cocking movement of the swashplate 236 as described in greater detail below.

The PCS 116 further comprises a Flight Control Computer (FCC) 126 configured to manage the overall operation of the UAV 100. The FCC 126 is configured to receive inputs from flight sensors 128 such as, but not limited to, gyroscopes, accelerometers, and/or any other suitable sensing equipment configured to provide the FCC 126 with spatial, positional, and/or force dynamics information, data, and/or feedback that can be utilized to manage the flight and/or operation of the UAV 100. In some embodiments, PCS 116 comprises Global Positioning System (GPS) components 130 configured to determine, receive, and/or provide data related to the location of the UAV 100 and/or flight destinations, targets, no-fly zones, preplanned routes, flight paths, and/or any other geospatial location related information. The GPS components 130 can be configured for bidirectional communication with the FCC 126, unidirectional communication with the FCC 126 being configured to receive information from the GPS components 130, or unidirectional communication with the FCC 126 being configured to provide information to the GPS components 130. In some embodiments, PCS 116 comprises wireless communication components 132, such as, but not limited to, radio communication equipment configured to send and/or receive signals related to flight commands and/or other operational information.

The wireless communication components 132 can be configured to transmit video, audio, and/or other data gathered, observed, and/or information otherwise generated, carried by, and/or obtained by the UAV 100. In some cases, a payload 134 of the PCS 116 can comprise a video camera, thermal camera, infrared imaging device, chemical sensor configured to determine a presence and/or concentration of a chemical, a weapon, and/or any other suitable payload. In some cases, the payload 134 can be configured to provide information or data to the FCC 126 and the FCC 126 can be configured to control and/or manipulate the payload 134. While not shown, each of the components of PCS 116 that require electrical energy to operate can be powered by the battery 118. In alternative embodiments, the battery 118 can be replaced and/or supplemented with other sources of electricity, such as, but not limited to, capacitors, photovoltaic solar cells, fuel cells, and/or any other system or component configurable to provide electrical energy to components of the UAV 100.

Referring now to FIGS. 5-7, partial schematic views of the UAV 100 are shown with a left side adjustable wing 104 in various states of deployment. FIG. 5 shows an adjustable wing 104 in a fully deployed configuration. The adjustable wing 104 generally comprises a flexible wing skin 136, a root arm 138 movably connected to the fuselage 102, and an extension arm 140 movably connected to the root arm 138. In this embodiment, the wing skin 136 comprises latex and/or natural rubber. However, in other embodiments, any other suitable flexible material may be used that is relatively lightweight, bendable, stretchable, and/or otherwise well-suited for serving as a stowable, foldable, and/or crushable skin of a wing. In this embodiment, the wing skin 136 is configured to allow repeated bunching, folding, and bending of the wing skin 136 so as to allow deployment and retraction of the adjustable wings 104 without substantially compromising wing skin 136 material.

Figure 3:
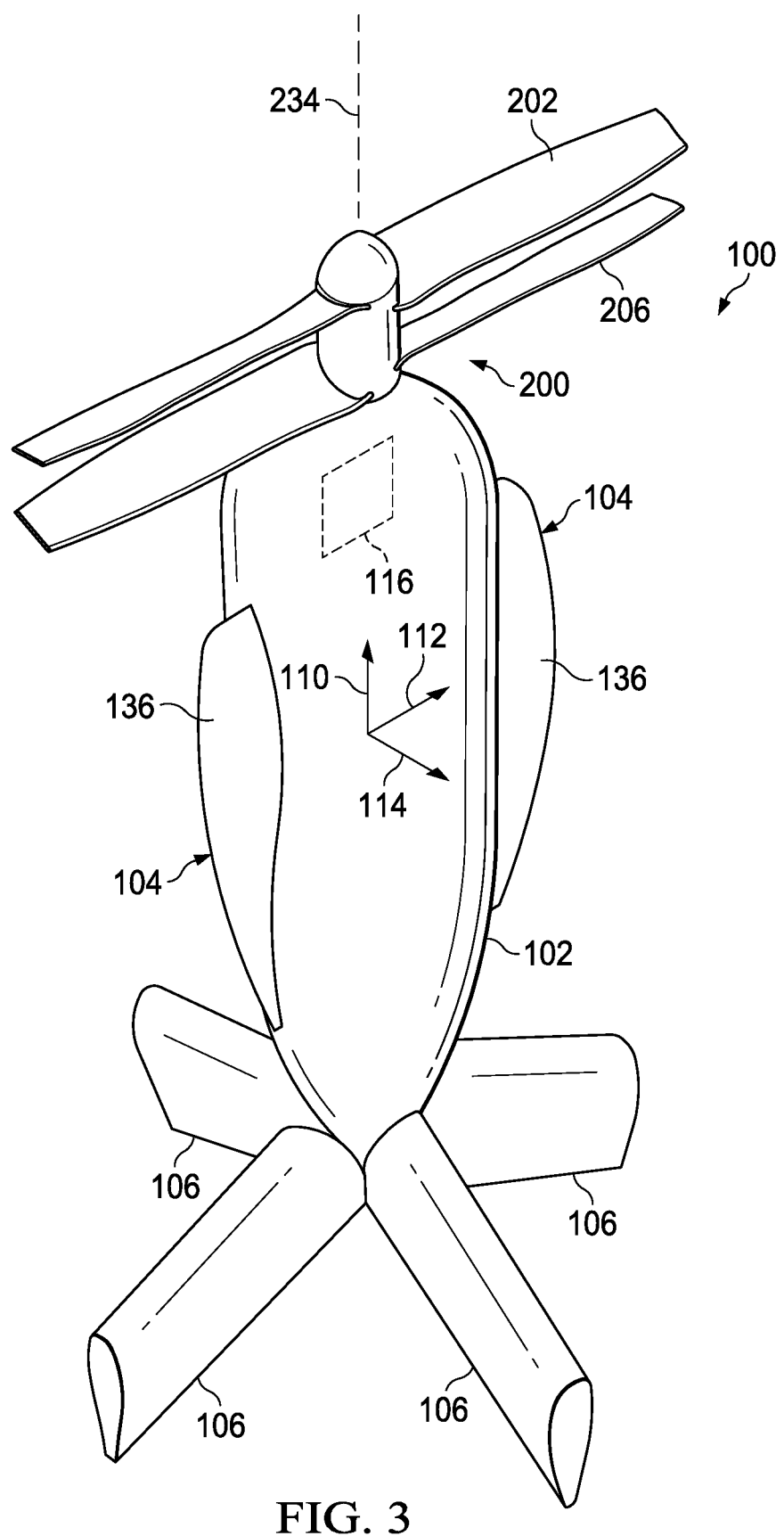
FIG. 3 is an oblique view of the UAV of FIG. 1 in a helicopter mode of operation.
Figure 4:
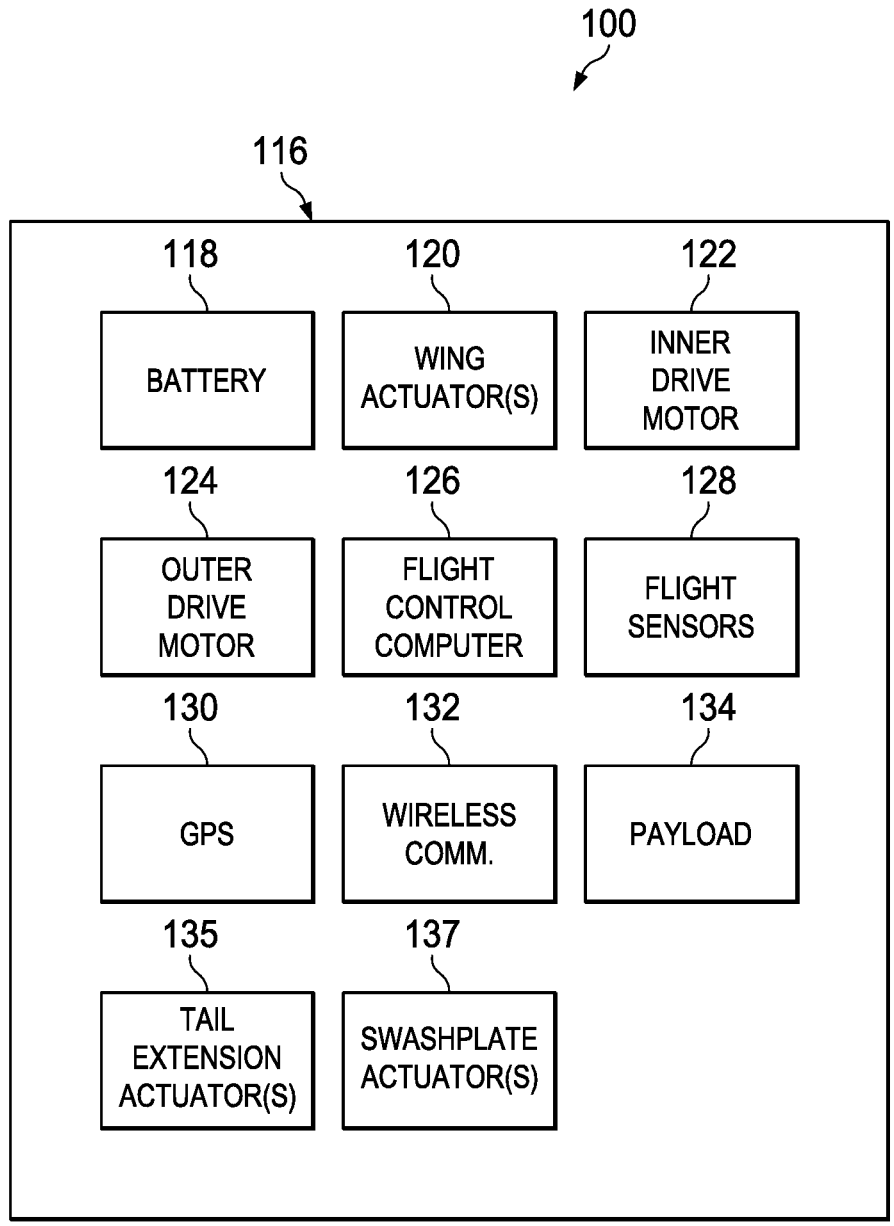
FIG. 4 is a schematic view of a Power and Control System (PCS) of the UAV of FIG. 1.

While the wing skin 136 is shown in FIGS. 1-3, the wing skin 136 is substantially hidden (but outlined with dashed lines) in FIGS. 5-7 to allow viewing of the root arm 138 and the extension arm 140. In some embodiments, the wing skin 136 can be formed as a sack-like structure that receives the root arm 138 and the extension arm 140. In other embodiments, the wing skin 136 can comprise substantially a single layer of material. Regardless of the structure of the wing skin 136, the wing skin 136 is attached to and/or tethered at appropriate locations along the fuselage 102, the root arm 138, and/or the extension arm 140 so that upon full extension and/or deployment of the adjustable wing 104, a predetermined aerodynamic surface is provided to enhance lift of the UAV 100 while the UAV 100 is in the airplane mode of operation.

In this embodiment, the root arm 138 is pinned and rotatably connected to the fuselage 102 using a pin 142 and a bearing 144. The root arm 138 comprises a connection aperture 146 configured to receive a linkage to the wing actuator 120 so that when the wing actuator 120 is actuated, the linkage forces rotation of the root arm 138 about the pin 142. In some cases, biasing mechanisms, such as, but not limited to, torsion springs can be utilized to rotationally bias the root arm 138 in a deployed configuration (see FIG. 5) and/or a stowed configuration (see FIG. 7). In some cases, an elasticity of the wing skin 136 may be sufficient to bias the root arm 138 toward the stowed configuration. Similarly, extension arm 140 that is movably connected to the root arm 138 using a pin 148 may be rotationally biased relative to the root arm 138 about the pin 148.

In this embodiment, the root arm 138 comprises a leading profile 150 that generally serves to form the shape of the leading-edge of the adjustable wing 104. As mentioned above, in some embodiments the leading profile 150 may be covered by wing skin 136 (in the case of the sack-like wing skin structure). However in alternative embodiments where the wing skin 136 comprises a single layer of material that is not doubled over itself to form a sack, the wing skin 136 may be attached to a trailing profile 152 of the root arm 138. In such a case, the wing skin 136 may similarly be attached to an inner profile 154 of the extension arm 140 rather than wrapping around an outer profile 156 of the extension arm 140. In some embodiments, a selectively engaged brake, lock, and/or rigid linkage configuration can prevent unwanted stowing and/or retraction of the adjustable wing 104 from the deployed configuration.

To stow the adjustable wing 104 or to otherwise reduce an aerodynamic lift area of the adjustable wing 104, any engaged brake or lock may be released and a distal end 158 of the extension arm 140 can be moved toward the rear of the fuselage 102. In some embodiments, the movement of the extension arm 140 can be effectuated by operating the wing actuator 120 and a direction opposite to that utilized to deploy the adjustable wing 104. Further, the distal end 158 of the extension arm 140 may be pulled toward the rear of the fuselage 102 using a spool of string, cable, and/or elastic cord. It will be appreciated that while the embodiments shown in FIGS. 5-7 stow and/or fold and store the adjustable wings 104 to a position adjacent an exterior of the fuselage 102, in alternative embodiments, a slot, channel or other receptacle may be provided on the fuselage 102 to allow at least a portion of the wing skin 136, root arm 138, and/or extension arm 140 to be received within the fuselage 102.

In operation, UAV 100 can be initially stored in a small box, backpack, or sack with the adjustable wings 104 in a stowed or retracted position. Once the UAV 100 is removed from storage, a desired configuration of initial operation can be selected, namely, airplane mode or helicopter mode. In some cases, a mode of operation in between airplane mode and helicopter mode can be selected as an initial operation. In cases where an initial mode of operation in helicopter mode is desired, the PCS 116 can control acceleration of the rotor system 200 and the UAV 100 may take flight substantially vertically. After taking off in helicopter mode, the FCC 126 of the PCS 116 can cause actuation of the wing actuators 120 to deploy the adjustable wings 104 as shown in FIG. 5. With the adjustable wings 104 deployed, the FCC 126 can control the rotor system 200 to pull the UAV 100 into the airplane mode orientation shown in FIG. 1 from the helicopter mode orientation shown in FIG. 3. In some cases, the UAV 100 can be launched from a first location in the helicopter mode, convert midair to the airplane mode, fly to a new location (in some cases at least partially guided by GPS coordinates interpreted by the GPS components 130), and subsequently reconvert to helicopter mode at the new location.

While at the new location, the UAV 100 can utilize onboard equipment, such as, but not limited to, payload 134 cameras to conduct surveillance and record and/or transmit information regarding the surveillance using the wireless communication components 132. After conducting the surveillance or otherwise completing a mission at the new location, the UAV 100 can once again convert to airplane mode and selectively return to the site of the launch and/or any other desired location within the range of the UAV 100. Of course, in alternative embodiments of operation methodology, the UAV 100 can be launched in airplane mode and can selectively switch between modes of operation as desired or necessary.

In some cases, an example of a necessary switch from airplane mode to helicopter mode may be in response to flight sensors 128 providing feedback to FCC 126 regarding gusts of wind, heavy rainfall, and/or other environmental flight encumbrances that are determined to prevent successful, safe, and/or efficient flight between locations. In response to undesirable flight conditions, the UAV 100 may convert to helicopter mode and automatically land itself upright on the movable tail extensions 106. Once the FCC 126 determines sufficiently favorable flying conditions, the UAV 100 may launch itself using helicopter mode and again convert to airplane mode to continue travelling to a desired location.

Figure 8:
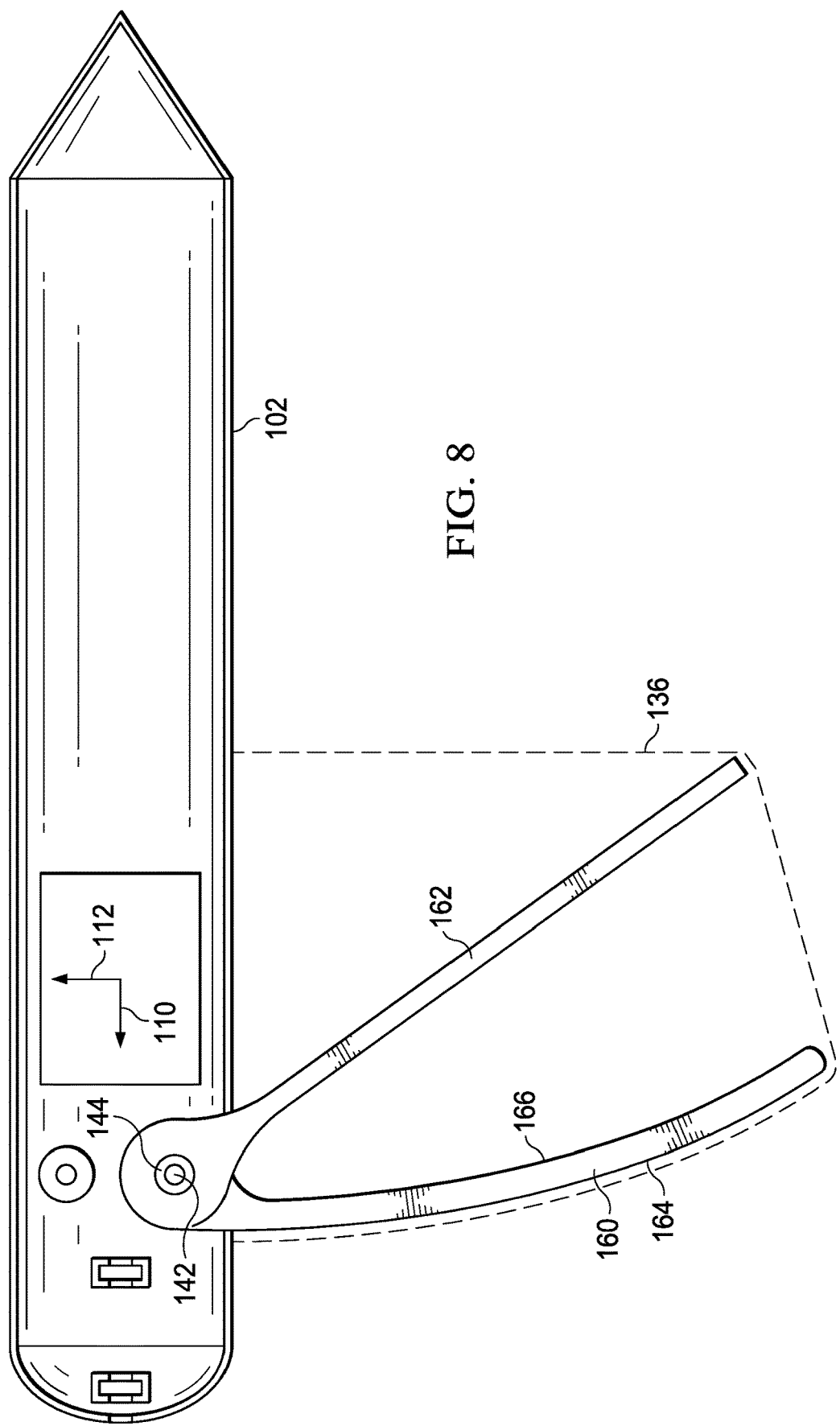
FIGS. 8-10 are schematic views of an alternative embodiment of an adjustable wing of the UAV of FIG. 1 in various states of deployment.
Figure 9:
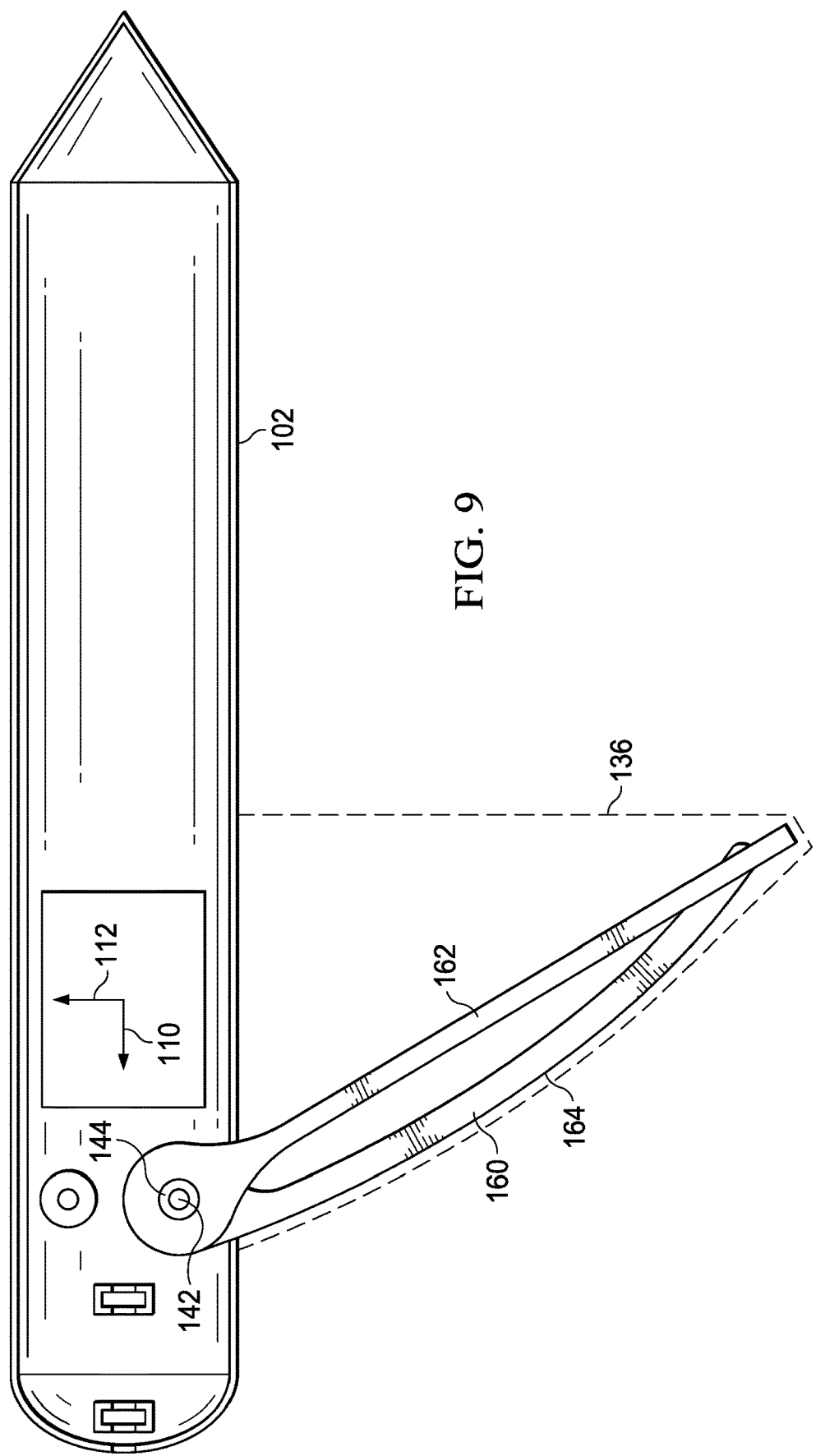
Figure 10:
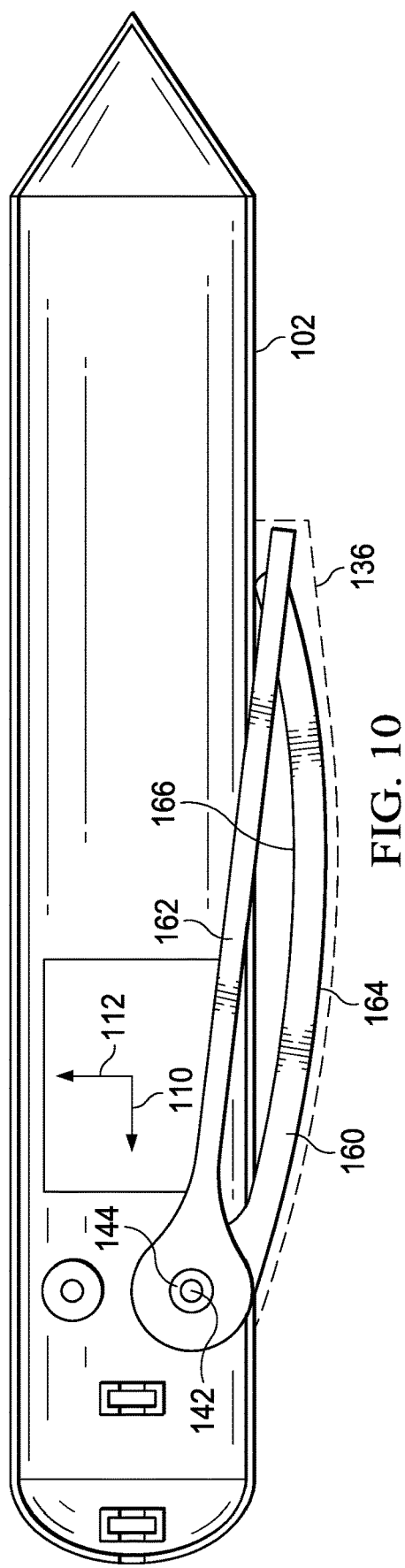

Referring now to FIGS. 8-10, partial schematic views of the UAV 100 are shown with a left side adjustable wing 104 in various states of deployment. However, in this embodiment, the adjustable wing 104 comprises a flexible wing skin 136, a leading arm 160 movably connected to the fuselage 102, and a spar 162 that is also movable connected to the fuselage 102. In this embodiment, the leading arm 160 and the spar 162 are pinned and rotatably connected to the fuselage 102 using a pin 142 and a bearing 144. The leading arm 160 comprises a connection aperture 146 configured to receive a linkage to the wing actuator 120 so that when the wing actuator 120 is actuated, the linkage forces rotation of the leading arm 160 about the pin 142. In some cases, biasing mechanisms, such as, but not limited to, torsion springs can be utilized to rotationally bias the leading arm 160 in a deployed configuration (see FIG. 8) and/or a stowed configuration (see FIG. 10). In some cases, an elasticity of the wing skin 136 may be sufficient to bias the leading arm 160 toward the stowed configuration. Similarly, spar 162 that is movably connected to the leading arm 160 and fuselage 102 may be rotationally biased relative to the leading arm 160 about the pin 142.

Figure 11:
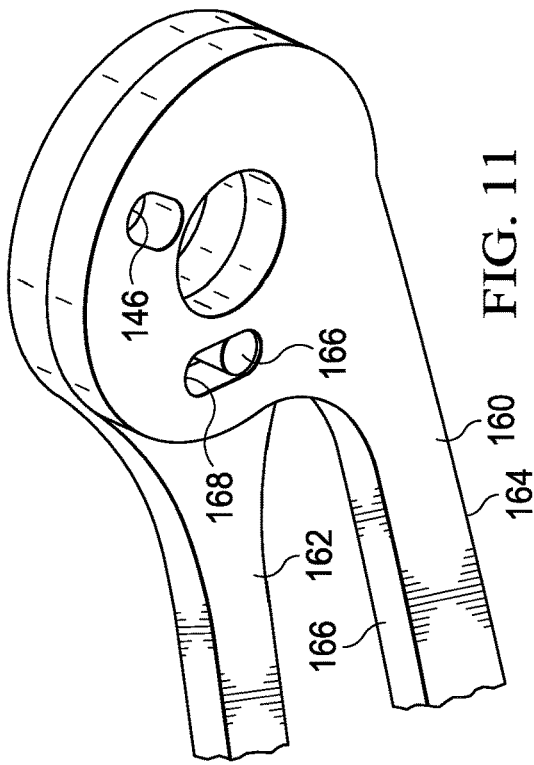
FIG. 11 is an oblique view of a portion of the adjustable wing of FIGS. 8-10.

In this embodiment, the leading arm 160 comprises a leading profile 164 that generally serves to form the shape of the leading-edge of the adjustable wing 104. As mentioned above, in some embodiments the leading profile 164 may be covered by wing skin 136 (in the case of the sack-like wing skin structure). In this embodiment, a slot, channel or other receptacle is provided on the fuselage 102 to allow at least a portion of the wing skin 136, leading arm 160, and/or spar 162 to be received within the fuselage 102. Further, the relative rotation of the spar 162 relative to the leading arm 160 is limited by the action of a tab 166 that extends from the spar 162 into a complementary slot 168 of the leading arm 160 (see FIG. 11). Utilizing the slot 168, the leading arm 160 can be rotated about the pin 142 to the fully deployed position and a known relative angular rotation about the pin 142 will be allowed before the tab 166 contacts an end of the slot 168, thereby causing rotation and deployment of both the leading arm 160 and the spar 162 at a same rate and while maintaining a known angular offset between the leading arm 160 and the spar 162 about the pin 142. The same slot 168 allows for the leading arm 160 to be stowed at least partially beneath the spar 162 when the leading arm 160 and the spar 162 are in the fully stowed position. Operation of the UAV 100 comprising the adjustable wing 104 of FIGS. 7-10 is substantially similar to the operation of the UAV 100 comprising the adjustable wing 104 of FIGS. 5-7.

Figure 12:
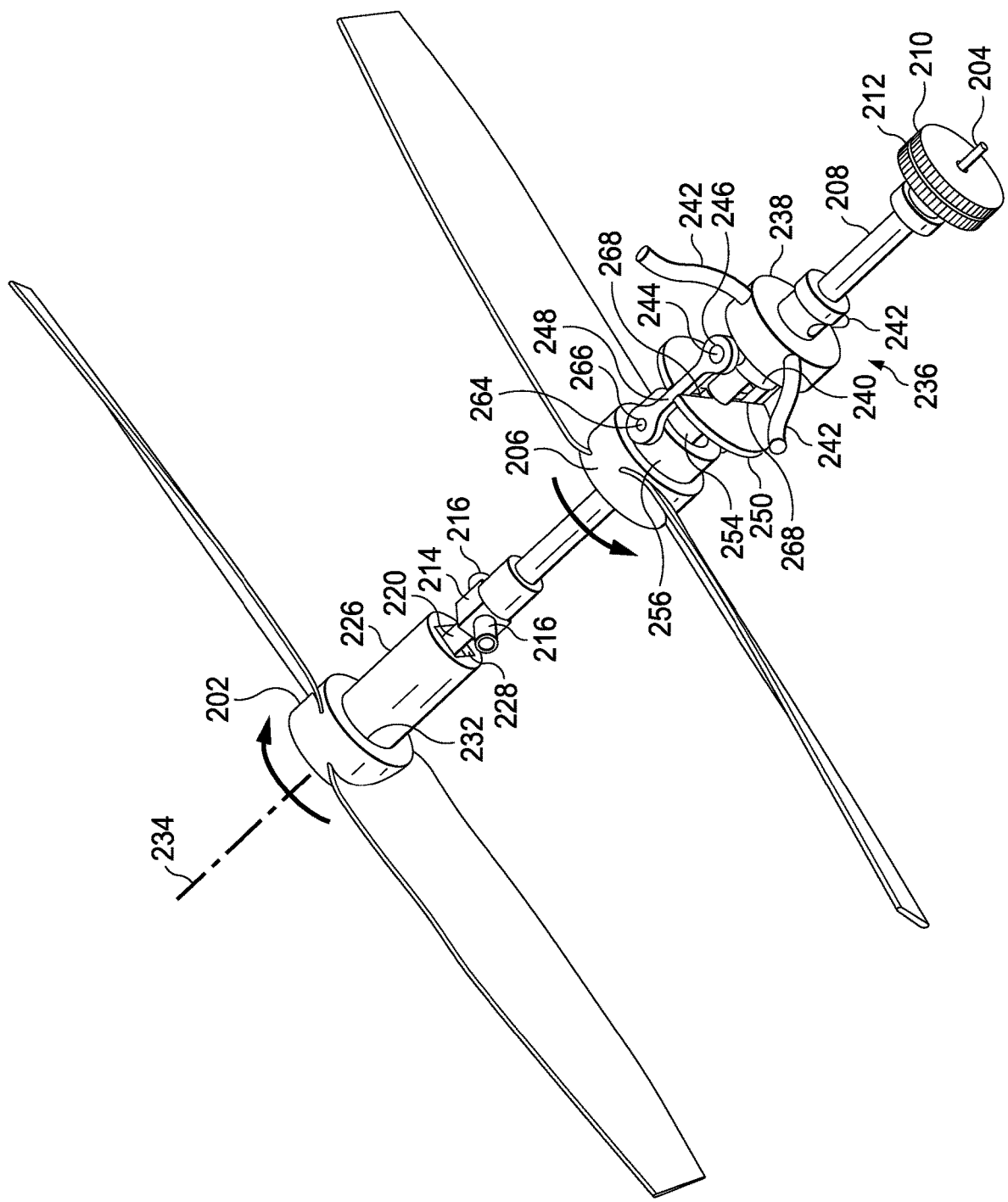
FIG. 12 is an oblique view of a rotor system of the UAV of FIG. 1.
Figure 13:
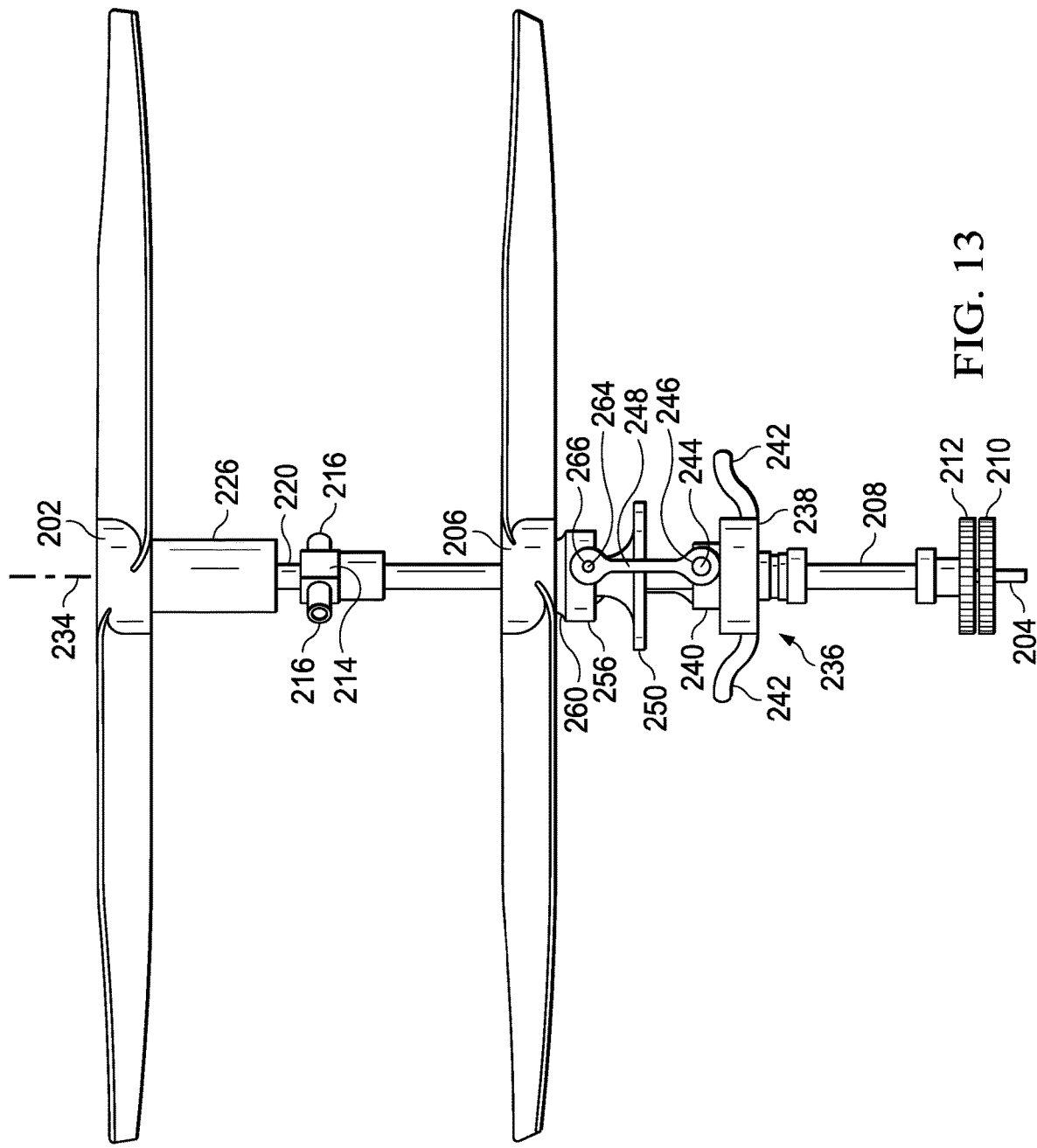
FIG. 13 is an orthogonal side view of the rotor system of FIG. 12.
Figure 14:
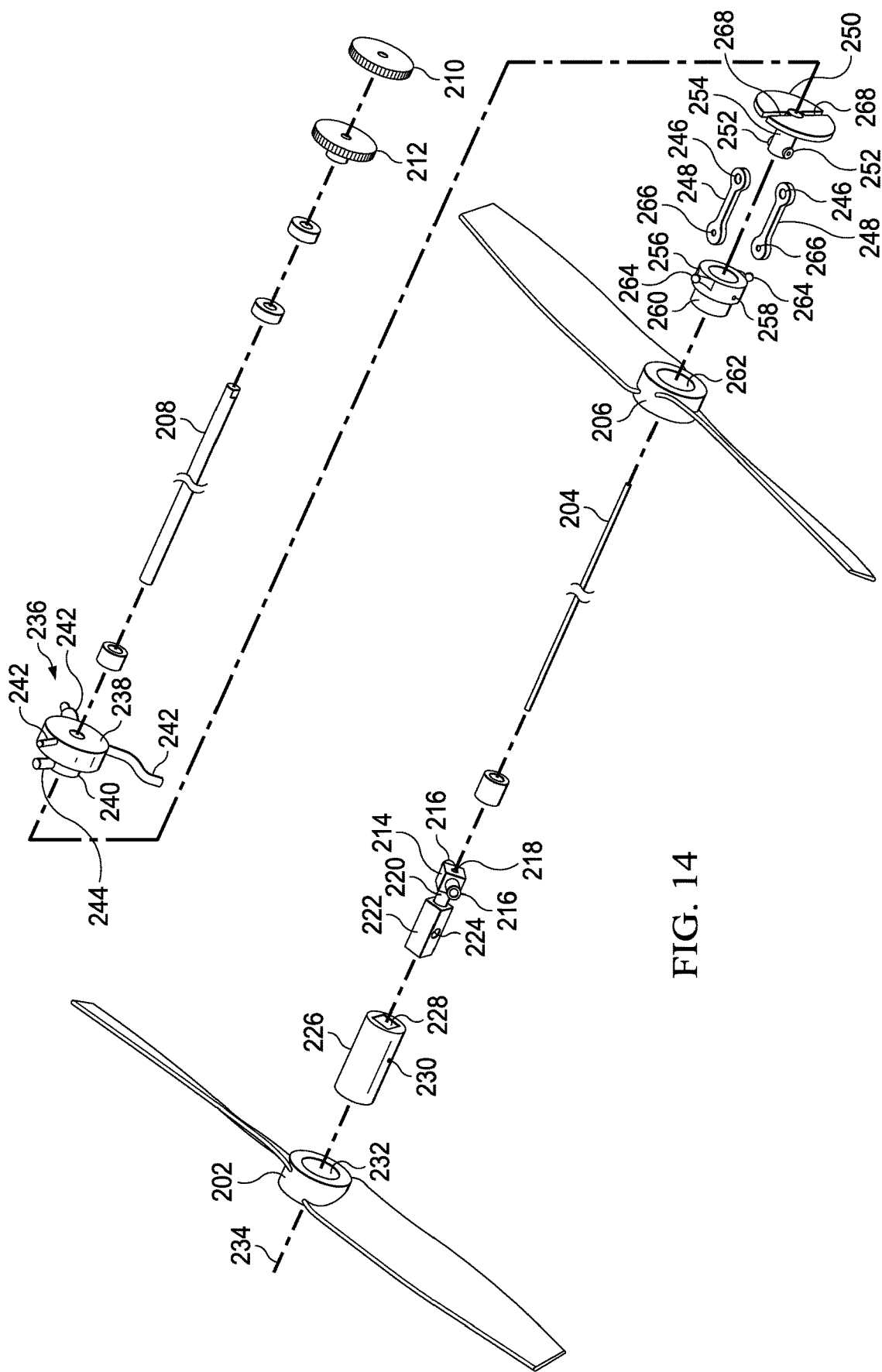
FIG. 14 is an oblique exploded view of the rotor system of FIG. 12.

Referring now to FIGS. 12-14, an embodiment of the coaxial counter-rotating rotor system 200 is shown in greater detail. Most generally, the rotor system 200 comprises a first blade assembly 202 that is driven by an inner shaft 204 and a second blade assembly 206 that is driven by a tubular shaft 208 that receives the inner shaft 204 therethrough. The inner shaft 204 is driven by a first gear 210 that is driven by a geared connection (not shown) to the inner drive motor 122. The tubular shaft 208 is driven by a second gear 212 that is driven by a geared connection (not shown) to the outer drive motor 124.

The first gear 210 is fixed to the inner shaft 204 and an end of the inner shaft 204 extends out through the first gear 210. The other end of the inner shaft 204 extends out through the tubular shaft 208 and is received within a block key driver 214. The block key driver 214 comprises set screw tubes 216 configured to receive set screws therein and to allow tightening of set screws to affix the block key driver 214 to the inner shaft 204. The inner shaft 204 is received within a mount hole 218 of the block key driver 214. The block key driver 214 further comprises a neck 220 connected to a block key 222. The block key 222 is substantially box-shaped and comprises a box hole 224. The rotor system 200 further comprises a box receiver tube 226 that comprises a receiver hole 228 that is shaped to complement the block key 222 and to receive the block key 222 therein. When the block key 222 is inserted into the receiver hole 228, a set screw can be applied through a set screw hole 230 of the box receiver tube 226 outer wall and into the box hole 224. The box receiver tube 226 is received into a hub hole 232 of the first blade assembly and is fixed relative to the hub hole 232. In operation, the inner drive motor 122 is configured to drive the first gear 210, the inner shaft 204, the block key driver 214, the box receiver tube 226, and the first blade assembly 202 angularly about an axis of rotation 234 and independent of rotation of the tubular shaft 208 and/or the second blade assembly 206.

The second gear 212 is fixed to the tubular shaft 208 and an end of the tubular shaft extends out through the second blade assembly 206. The rotor system 200 comprises a swashplate 236 comprising a non-rotating outer ring 238 and a rotating inner ring 240. The non-rotating outer ring 238 comprises a plurality of control arms 242 that are configured for attachment to servo motors and/or linear actuators via additional linkages (not shown). Like other swashplates, the swashplate 236 is configured to allow cocking of the swashplate 236 relative to the axis of rotation 234 and relative to the tubular shaft 208. As the swashplate 236 is selectively cocked as a whole, the non-rotating outer ring 238 remains substantially angularly locked while the rotating inner ring 240 angularly rotates along with the tubular shaft 208. The rotating inner ring 240 comprises link pegs 244 that are received within first link hole 246 of a substantially dogbone shaped link 248. A drive interface 250 is secured to the tubular shaft 208 above the swashplate 236 and comprises lateral drive tubes 252 extending from a drive tube 254 that receives the tubular shaft 208 therethrough.

A tubular swivel hat 256 is provided above the drive tube 254. In this embodiment, the drive tube 254 (including the lateral drive tubes 252) is received within the tubular swivel hat 256 so that a shared lateral axis of the lateral drive tubes 252 aligns with lateral pin holes 258 formed in the tubular swivel hat 256. When a pin is inserted through the lateral pin holes 258 and the lateral drive tubes 252, the tubular swivel hat 256 is locked in angular rotation with the tubular shaft 208 but is allowed to rotate about the pin (not shown) that extends through the lateral pin holes 258 and the lateral drive tubes 252. Because the tubular swivel hat 256 comprises a hub insert 260 that is received within a hub hole 262 of the second blade assembly 206, the second blade assembly 206 is free to swivel about the pin (not shown) that extends through the lateral pin holes 258 and the lateral drive tubes 252. However, the tubular swivel hat 256 is not simply free to swivel about the above-described pin (not shown). Instead, the tubular swivel hat 256 comprises hat control arms 264 that are received within second link holes 266 of the links 248, thereby restricting the swiveling action to the movement caused by cocking the swashplate 236 relative to the axis of rotation 234. The cocking movement of the swashplate 236 is transferred to the tubular swivel hat 256 via the links 248 and the links 248 extend through link slots 268 in the drive interface 250.

The above-described rotor system 200 allows the first blade assembly 202 to be driven independent of the second blade assembly 206. In this embodiment, the first blade assembly 202 is driven in a counter-clockwise direction and the second blade assembly 206 is driven in a clockwise direction when viewing from the front. As such, the counter-rotation of the blade assemblies 202, 206 prevents wholesale rotation of the UAV 100 without the use of a tail rotor or other anti-torque system and/or device. In this embodiment, when the UAV 100 is in the helicopter mode of operation, changes in the relative speed of the first blade assembly 202 and the second blade assembly 206 can produce changes in yaw positioning of the UAV 100. However, when the UAV 100 is in the airplane mode of operation, changes in the relative speed of the first blade assembly 202 and the second blade assembly 206 can produce changes in roll positioning of the UAV 100.

Further, by connecting the control arms 242 to actuators, servos, and/or other push-pull devices, the entirety of the second blade assembly 206 can be cocked relative to the axis of rotation 234 while the first blade assembly 202 remains unchanged and in a fixed and uncocked orientation relative to the axis of rotation 234. In some embodiments, by selectively cocking the swashplate 236, the UAV 100 can selectively provide thrust vectoring to obtain lateral movement while the UAV 100 is in helicopter mode. Similarly, while the UAV 100 is in airplane mode, cocking the swashplate 236 can provide selective thrust vectoring to alter a path of the UAV 100.

Figure 15:
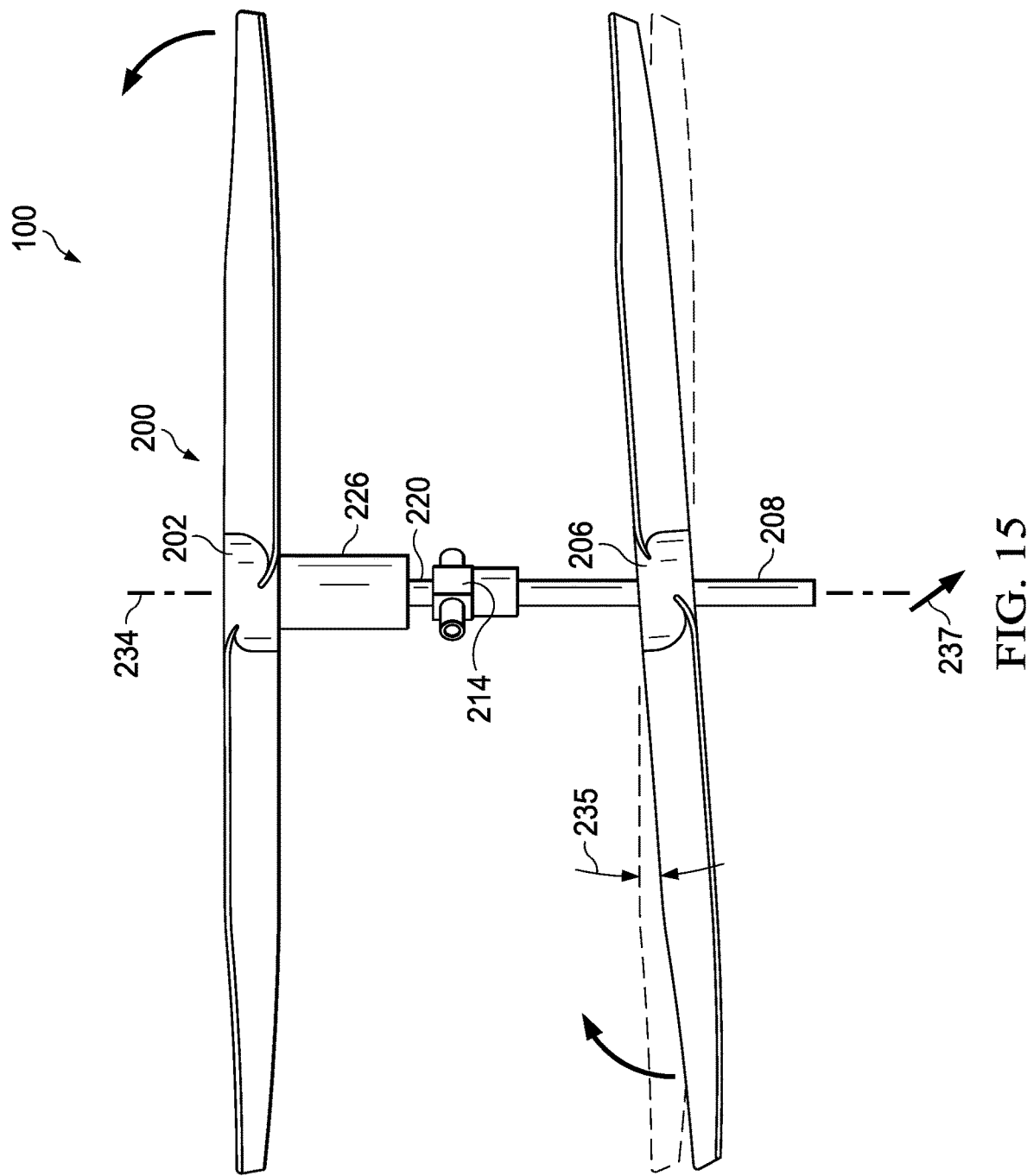
FIG. 15 is another orthogonal side view of the rotor system of FIG. 12 showing a blade assembly in a cocked position.

Referring now to FIG. 15, the rotor system 200 is shown with the second blade assembly 206 cocked about the axis of rotation 234 by a cocking angle 235 by about 5 degrees relative to the uncocked second blade assembly 206 position shown in broken lines. In operation while the first blade assembly 202 rotates in a first direction about the axis of rotation 234 and the second blade assembly 206 rotates in a second direction about the axis of rotation 234 opposite the first direction, the second blade assembly 206 can be selectively cocked to provide a desired thrust vector 237 that is not parallel to the axis of rotation 234. When the UAV 100 is in the helicopter mode of operation, the thrust vector 237 can contribute to moving the UAV 100 in lateral directions and/or to overcoming wind and/or wind gusts that may otherwise undesirably move the UAV 100 for a desired geographical location. When the UAV 100 is in the airplane mode of operation, the second blade assembly 206 can be cocked to turn the UAV 100, change an altitude of the UAV 100 and/or combinations thereof. By controlling the cocking of the second blade assembly 206, independently controlling the speeds of the blade assemblies 202, 206, controlling the adjustable wings 104, and controlling the movable tail extensions 106, the UAV 100 can maneuver and fly in a variety of positions.

In this embodiment, the UAV 100 comprises a total weight of about 150 grams or less, but the systems and methods disclosed herein can be utilized with larger UAVs and/or any other aircraft. Further, while the UAV 100 is shown as comprising an uncockable outer, distal, or end blade assembly, in alternative embodiments, it is contemplated that a UAV substantially similar to the UAV 100 can be provided that comprises a cockable outer, distal, or end blade assembly in addition to or instead of the cockable inner, proximal, or inner blade assembly.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An Unmanned Aerial Vehicle (UAV), comprising:
a fuselage;
a rotor system;
a wing comprising a leading arm carried by the fuselage, the leading arm being movable relative to the fuselage, and the wing being configured for selective positioning during flight of the UAV to a deployed position, a stowed position, and to positions between the deployed position and the stowed position; and
a flexible wing skin at least partially carried by the leading arm;
wherein the leading arm is rotatable relative to the fuselage.

2. The UAV of claim 1, wherein the flexible wing skin comprises a sack-like structure and wherein the leading arm is disposed within the flexible wing skin.

3. The UAV of claim 1, the wing further comprising:
an extension arm carried by the leading arm, wherein the extension arm is movably connected to the leading arm.

4. The UAV of claim 1, the wing further comprising:
a spar carried by the fuselage and movable relative to the fuselage.

5. The UAV of claim 4, wherein the spar is rotatable relative to the fuselage about a same axis of rotation about which the leading arm is rotatable relative to the fuselage.

6. The UAV of claim 1, wherein the flexible wing skin comprises latex or natural rubber.

7. The UAV of claim 1, wherein the leading arm is spring biased toward at least one of a fully deployed position, a fully stowed position, and a position between the fully deployed position and the fully stowed position.

8. A method of operating an Unmanned Aerial Vehicle (UAV), comprising:
providing a UAV with a wing configured for selective positioning during flight of the UAV to a deployed position, a stowed position, and to positions between the deployed position and the stowed position; and
operating the UAV in a helicopter mode of operation while the wing is not fully deployed.

9. The method of claim 8, further comprising:
launching the UAV with the wing in a deployed position;
operating the UAV in an airplane mode of operation; and
while flying the UAV, moving the wing from the deployed position toward a stowed position.

10. The method of claim 8, further comprising:
launching the UAV with the wing in at least one of the stowed position and a position between the deployed position and the stowed position;
operating the UAV in a helicopter mode of operation; and
while flying the UAV, moving the wing from the at least one of the stowed position and a position between the deployed position and the stowed position toward the deployed position.

11. The method of claim 10, further comprising:
operating the UAV in an airplane mode of operation while the wing is in at least one of the deployed position and a position between the deployed position and the stowed position.

12. A method of operating an Unmanned Aerial Vehicle (UAV), comprising:
providing a UAV with a wing configured for selective positioning during flight of the UAV to a deployed position, a stowed position, and to positions between the deployed position and the stowed position;
launching the UAV at a first geographic location;
operating the UAV in an airplane mode of operation to move the UAV from the first geographic location to a second geographic location; and
during flight of the UAV, changing a position of the wing and operating the UAV in a helicopter mode of operation to hover near the second geographic location;
wherein the wing is in a deployed position during at least a portion of flight in the airplane mode of operation and wherein the wing is in a stowed position during at least a portion of flight in the helicopter mode of operation.

13. The method of claim 12, further comprising:
performing an operation associated with a payload of the UAV while hovering near the second geographic location.

14. The method of claim 13, further comprising:
during flight of the UAV, changing a position of the wing and operating the UAV in the airplane mode of operation to move the UAV from the second geographic location to a third geographic location.

15. The method of claim 14, wherein the third geographic location is the same as the first geographic location.

* * * * *